United States Patent [19]

Rieger et al.

[11] 3,969,932

[45] July 20, 1976

[54] METHOD AND APPARATUS FOR MONITORING THE ACTIVITY OF CATALYTIC REACTORS

[75] Inventors: Franz Rieger, Wasseralfingen; Ernst Linder, Muhlacker; Peter Jürgen Schmidt, Schwieberdingen, all of Germany

[73] Assignee: Robert Bosch G.m.b.H., Stuttgart, Germany

[22] Filed: Aug. 13, 1975

[21] Appl. No.: 604,320

[30] Foreign Application Priority Data

Sept. 17, 1974 Germany............................ 2444334

[52] U.S. Cl. ...................................... 73/118; 60/277
[51] Int. Cl.² ......................................... G01M 15/00
[58] Field of Search............... 73/118, 119 R; 60/277

[56] References Cited
UNITED STATES PATENTS

| | | | |
|---|---|---|---|
| 3,086,353 | 4/1963 | Ridgway | 73/118 UX |
| 3,211,534 | 10/1965 | Ridgway | 73/118 UX |
| 3,441,381 | 4/1969 | Keith et al. | 73/118 UX |

Primary Examiner—Jerry W. Myracle
Attorney, Agent, or Firm—Edwin E. Greigg

[57] ABSTRACT

The inlet and outlet ends of a catalytic reactor are instrumented with oxygen sensors. A change of the fuel-air concentration of the combustible mixture is indicated by a jump in the output voltage of the sensors; the voltage of the inlet sensor changes before that of the outlet sensor and the greater the time difference between these changes, the higher is the catalytic activity of the reactor. When a repeatable and constant engine condition is reached, the fuel-air mixture is abruptly changed and an electronic circuit enables a logical circuit which controls a signal lamp. If, during a predetermined time interval, the outlet sensor also changes its output voltage, indicating a time difference which is too short, the warning signal is energized and the operator is alerted to the insufficient level of reactor activity.

11 Claims, 3 Drawing Figures

METHOD AND APPARATUS FOR MONITORING THE ACTIVITY OF CATALYTIC REACTORS

BACKGROUND OF THE INVENTION

The invention relates to a process and an apparatus for monitoring the activity of catalytic reactors located in the exhaust system of internal combustion engines. The monitor signals are taken from exhaust gas sensors located at the inlet and outlet ends of the catalytic reactor.

Catalytic reactors are used for exhaust gas detoxication in internal combustion engines. They are inserted in the exhaust systems of these engines and their activity must be monitored. The lifetime of catalytic reactors is highly dependent on the temperature and the total gas throughput which, in turn, depend on the operational states and conditions of the internal combustion engine. In addition, the lifetime of catalytic reactors is affected by poisons, for example by lead, sulphur or phosphorus which may be present in the fuel. These effects may change the capacity of the catalyzer to convert toxic material, and when the conversion of toxic materials falls below a predetermined limit, the engine may not be usable under the prevailing regulations.

A known apparatus for monitoring the activity of catalyzers includes two exhaust gas measuring sensors. One of these exhaust gas sensors is installed at the inlet and the other at the outlet of the catalyzer and they measure the oxygen concentration of the exhaust gas at the inlets and outlets of the catalyzer, respectively. The difference of these two signals is a measure of the activity or performance capacity of the catalytic reactor. The described system operates with sufficient accuracy only in certain operational domains and it is quite difficult to determine what these domains are.

OBJECTS AND SUMMARY OF THE INVENTION

It is thus a principal object of the invention to provide a method which may be used to monitor the activity of catalytic reactors in relatively simple fashion and to provide a warning signal when the activity of the catalyzer falls below a predetermined limiting value.

This first principal object of the invention is attained by finding a predetermined operational condition of the internal combuston engine at which time the output signal of the exhaust gas sensor is caused to change, and measuring the time period which elapses between the switchover of the first exhaust gas sensor to the switchover of the second exhaust gas sensor. This difference is a measure of the catalyzer activity.

It is a second principal object of the invention to provide an apparatus for carrying out the above described process. This apparatus should be simple and economical in operation and in construction and should operate reliably even during rough use of the vehicle. This apparatus should make use of elements already present in the vehicle or in the exhaust system of the vehicle for monitoring the catalyzer activity.

This second principal object is attained by providing an apparatus for an internal combustion engine of the type which has a system for changing the fuel mixture ratio in dependence on the output signal of an exhaust gas sensor located in the exhaust system and which also includes a first threshold switch and an integrating circuit which takes the output signal from the exhaust gas sensor and uses it to control a fuel preparation mechanism. The apparatus of the invention provides the inclusion of a second exhaust gas sensor and a second threshold switch connected thereto and it further provides a pulse comparison circuit having a timing element which receives the output signals from the first and second threshold switches and also receives signals from a transducer which characterizes the operational condition of the internal combustion engine.

DESCRIPTION OF THE PREFERRED EMBODIMENT

Figure 1:
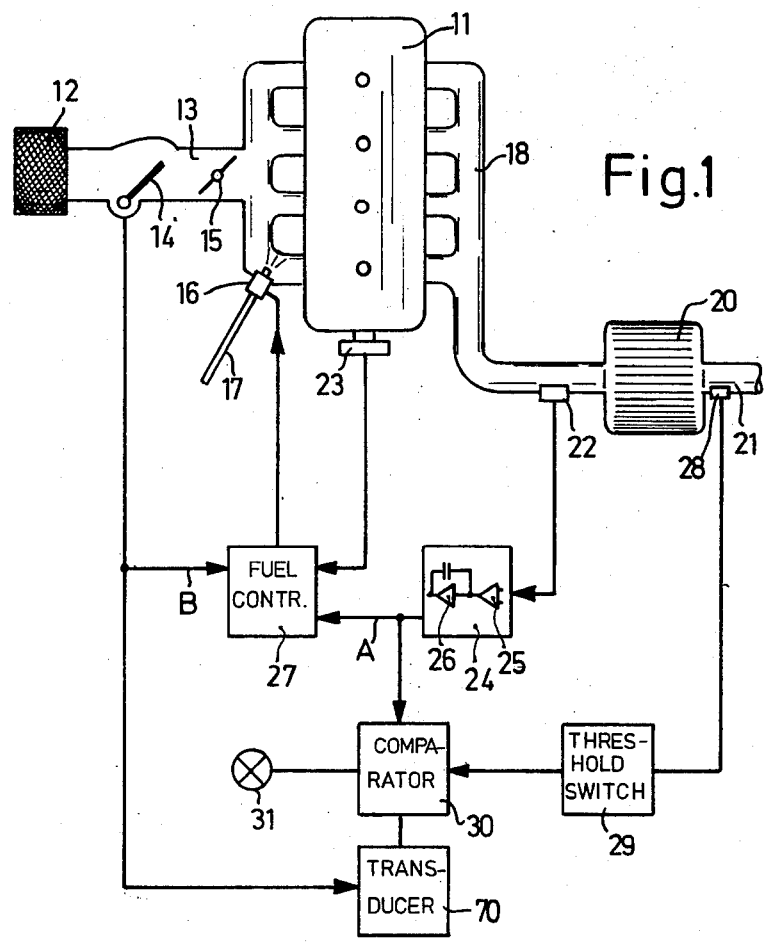
FIG. 1 is a block diagram of an apparatus for monitoring the activity of a catalytic reactor.

Turning now to the drawing, FIG. 1 is an illustration of a four-cylinder internal combustion engine 11 in which the combustion air flows through an air filter 12 and an induction tube 13 which contains a throttle butterfly valve 15 which is actuated by a gas pedal (not shown). An air flow rate meter 14 is disposed in the induction tube between the air filter 12 and the throttle butterfly valve 15 and it is embodied as a baffle plate with an electrical output. Each cylinder of the internal combustion engine 11 has associated with it an injection valve 16 which injects fuel into the induction tube 13 immediately ahead of the inlet valve of the corresponding cylinder. Only one of these injection valves 16 is shown in FIG. 1. This valve is supplied with fuel through a fuel line 17.

The exhaust valves of the internal combustion engine 11 communicate with an exhaust gas manifold 18 which, in turn, is connected to a catalytic reactor 20. Following the catalytic reactor 20 is an exhaust pipe 21 which includes a muffler unit which is not shown.

Installed in the wall of the tubulation which leads to the catalytic reactor 20 is a first oxygen sensor 22 to which a control amplifier 24 is connected electrically. The control amplifier 24 includes a first threshold switch 25 and an injector 26. A pulse generator 23 is coupled to the crankshaft of the engine 11 and delivers control pulses in synchronism with the crankshaft rpm for a transistorized fuel control circuit 27. The circuit 27 generates pulses whose duration controls the opening time of the fuel injection valves 16. This pulse duration is also influenced by the output voltages of the air flow rate meter 14 and of the control amplifier 24. For this purpose, the electrical outputs of the control amplifier 24 and of the air flow rate meter 14 are connected with corrective inputs A and B belonging to the transistorized circuit 27. A detailed description of a circuit which may be used as fuel control circuit 27 is contained in U.S. Pat. No. 3,874,171. The injection valve 16 is actuated by a magnetic winding connected to the output of the circuit 27.

A second oxygen sensor 28 is disposed in the exhaust pipe 21 near the outlet of the catalytic reactor. This second oxygen sensor 28 is connected to a second threshold switch 29, in turn connected to a pulse comparator state 30. The pulse comparator stage 30 also receives the output signal from the control amplifier 24. A transducer 7 which produces a signal which is characteristic of a particular operational state of the engine 11 is connected to the pulse comparator stage 30. The transducer 70 is operatively connected to the air flow rate meter 14. The pulse comparator stage 30 measures the time delay between a change of the output signal from the first oxygen sensor 22 and the occurrence of a signal change from the second oxygen sensor 28. When the catalytic reactor has sufficient capacity, as determined by the time delay between the occurrence of the two signals, no warning is given but, if the catalytic reactor 20 is no longer sufficiently active, a warning signal 31, for example an incandescent lamp, is activated.

The measuring principle which is exploited with the use of the apparatus according to FIG. 1 is based on the possibility to cause a rapid change in the air number $\lambda$, which characterizes the ratio of air to fuel in the combustible mixture fed to the internal combustion engine, generally between $\lambda = 0.95$ and $\lambda = 1.05$ or vice versa. This may be done, for example, by changing the injection time. During such a change, the output potentials of the oxygen sensors change abruptly at the value $\lambda = 1.0$, for example from 850 millivolts to 100 millivolts. The signal from the second oxygen sensor changes somewhat later than the signal from the first oxygen sensor 22 located ahead of the catalytic reactor 20. This time difference, or phase shift, can be exploited as a measure for the activity of the catalyzer. In the case of a good, fully active catalytic reactor the phase shift is approximately 550 msec. but it decreases when the performance of the catalytic reactor declines. The useful lower limit of this phase shift is approximately 225 msec. for a catalyzer which is still just adequate.

The magnitude of the phase shift also depends on the gas throughput of the catalytic reactor. Thus, a dependable measurement requires that measurements of the time difference or of the phase shift are always made at the same gas throughput. The cause of the phase shift between the output signal from the first oxygen sensor 22 and the second oxygen sensor 28 is that the catalyzer requires a certain amount of time to change over from a reducing to an oxidizing atmosphere and to become adjusted to the higher oxygen content. At first, the surface of the catalyzer is still covered with the reducing component and this cover is only gradually oxidized by the increased oxygen content. During a change in the opposite sense, i.e., from an oxidizing to a reducing atmosphere, the above described process takes place in reverse but, in this case too, a certain amount of time passes before the new inlet concentration is also present at the outlet of the catalytic reactor. Thus the above-described processes may be generally catagorized as adsorption and desorption processes taking place on the surface of the catalytic reactor.

Another possibility to alter the air number $\lambda$ is to change the switching threshold of the first threshold switch 25. Such a change of the threshold also causes a change of the fuel-air mixture composition from rich to lean or the reverse.

Figure 2:
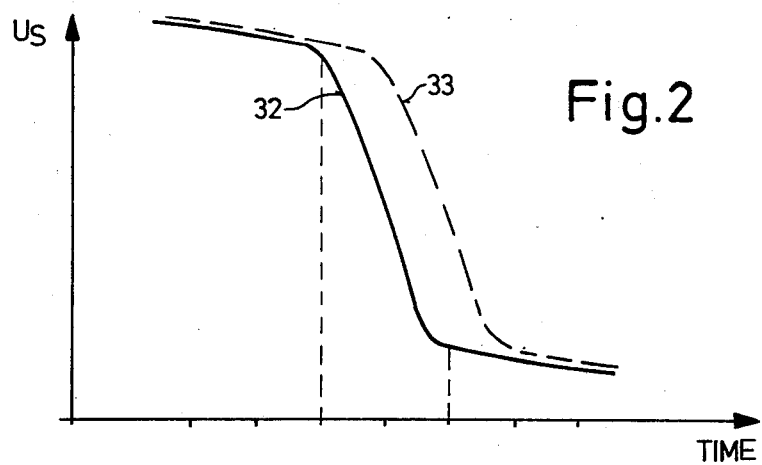
FIG. 2 is a diagram of the output voltage of the oxygen sensors as a function of time.

FIG. 2 is a diagram showing the output potential of the oxygen sensors 22 and 28 as a function of time. The ordinate carries the output potential $U_{S1,2}$ and the abscissa is the time axis. The curve designated 32 refers to the potential of the output voltage $U_{S1}$ of the first oxygen sensor 22, whereas the curve 33 refers to the output potential $U_{S2}$ of the second oxygen sensor 28, both curves applying to a particular gas throughput.

Figure 3:
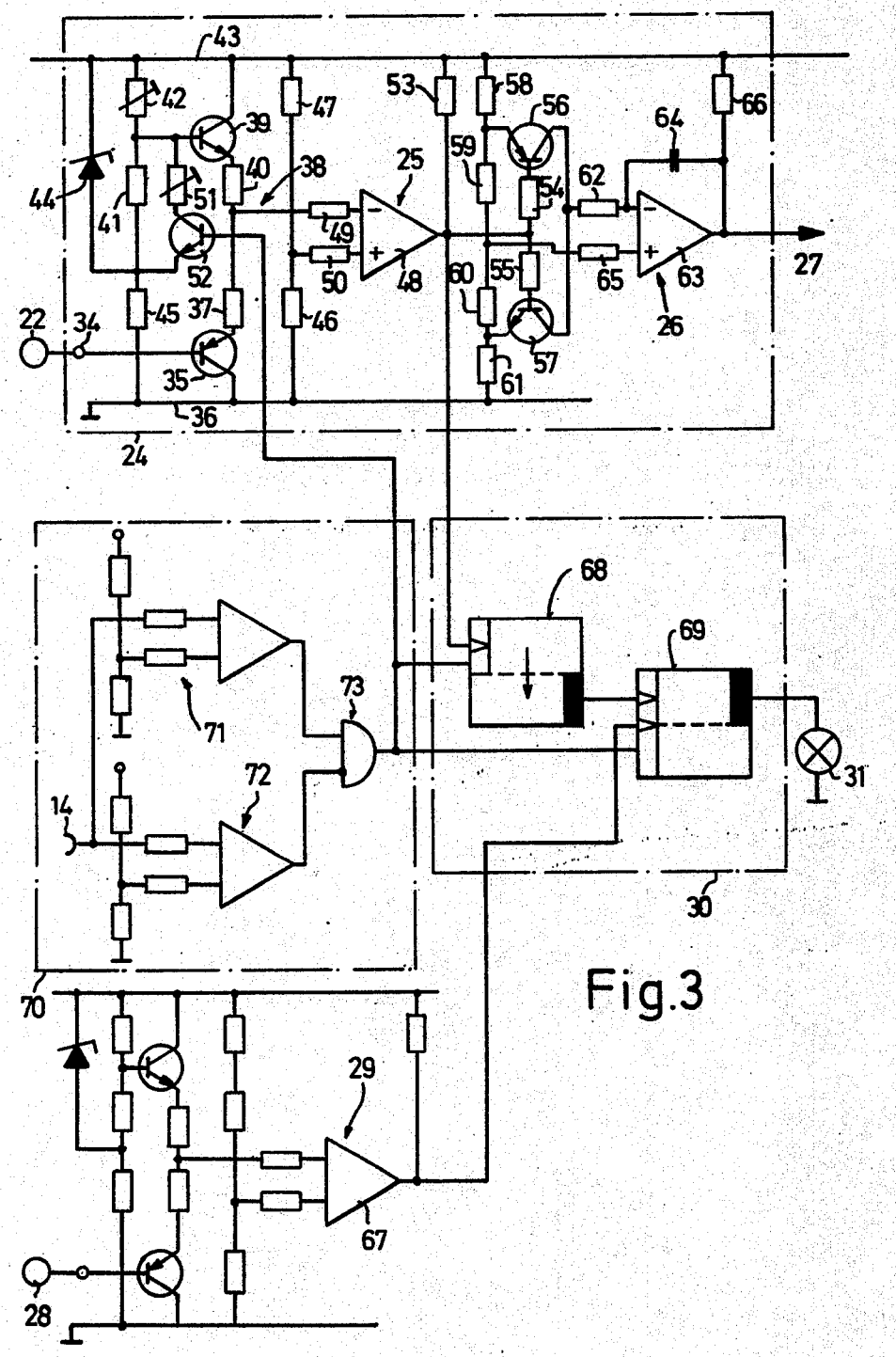
FIG. 3 is a circuit diagram of the apparatus according to the invention for monitoring the activity of a catalytic reactor.

The two output signals 32 and 33 shown in FIG. 2 are processed in a circuit shown in detail in FIG. 3. The first oxygen sensor 22 is connected with the input contact 34 of the control amplifier 24. This control amplifier includes a transistor 35 connected as an emitter follower. The collector of transistor 35 is connected to a common voltage supply line 36 and its emitter is connected to a resistor 37. The collector-emitter path of transistor 35 and the series resistor 37 form a first branch of a bridge circuit 38. A second branch of this bridge circuit 38 is formed by the series connection of the collector-emitter path of a transistor 39 and a resistor 40.

The base of transistor 39 is connected to the tap of a voltage divider comprising a resistor 41 and a fixed or variable resistor 42 connected to a common supply line 43. Placed in parallel with the series connection of the two resistors 41 and 42 is a Zener diode 44. The junction of the anode of the Zener diode 44 and of the resistor 41 is connected to a resistor 45 which is coupled to the common supply line 36. The third branch of the bridge circuit 38 is formed by a resistor 46 connected to the common supply line 36 and the fourth branch of the bridge circuit 38 includes a resistor 47 connected to the common supply line 43. The diagonal branch of the bridge circuit 38 is connected across the inputs of the first threshold switch 25 which includes an operational amplifier 48. The junction of resistors 40 and 37 is connected, via an input resistor 49, to the inverting input of the operational amplifier 48, whereas the junction of resistors 46 and 47 is connected, via an input resistor 50, to the non-inverting input of the operational amplifier 48. A series connection of a resistor 51 and the switching path of a switching transistor 52 is placed in parallel with the resistor 41, and the output of the operational amplifier 48 is connected to the common supply line 43 via a resistor 53. The output of the operational amplifier 48 is also connected to the junction of two base resistors 54 and 55, associated, respectively, with the transistors 56 and 57. The transistors 56 and 57, together with a voltage divider connected between the supply lines 46 and 33 and consisting of resistors 58, 59 and 61 form a system for changing the output voltage range of the operational amplifier 48. The emitter of transistor 56 is connected to the junction of resistors 58 and 59 and the emitter of transistor 57 is connected to the junction of resistors 60 and 61, while the collectors of the two transistors 56 and 57 are joined. These joined collectors are connected via an input resistor 62 to the inverting input of an integrator 26, consisting of an operational amplifier 63 with an integrating capacitor 64. The junction of resistors 59 and 60 is connected, via an input resistor 65, to the non-inverting input of the operational amplifier 63. The output of the operational amplifier 63 is connected, via a resistor 66, to the common supply line 43. This output is also fed to the transistor control circuit 27 which prolongs or shortens the duration of the injection pulses for the injection valve 16 in dependence on the output signal from the integrator 26.

The method of operation of the above-described circuit is known but will now be explained briefly:

The output signal from the first oxygen sensor is admitted to the first branch of the bridge circuit 38 via the transistor 35. This signal, which contains information regarding the composition of the exhaust gas of the internal combustion engine, forms the actual value of the controlled variable of the control loop. Inasmuch as the oxygen sensor 22 is of the type which has a high internal resistance when the exhaust gas temperatures are low, the control system must have a high input resistance. For this reason, the transistor 35 is connected in a so-called emitter-follower connection and, together with its load-resistor 37, forms the required input resistance of the system.

The desired or set-point value, i.e., that value of the air number λ to which the fuel-air mixture of the engine is to be adjusted, is obtained with the aid of the Zener diode 44. The Zener voltage is applied to a voltage divider consisting of resistors 41 and 42 whose junction is connected to the base of the transistor 39 and thus controls the voltage across the second branch of the bridge circuit 38. The resistor 42 permits adjustment of this set-point value. The transistors 35 and 39, in the first and second branches of the bridge circuit 38 respectively, are of opposite polarity and are connected so that their temperature dependence is mutually compensating. Since the comparison circuit which compares the set-point value with the actual value is embodied as a bridge circuit, it is independent of the supply voltage taken from the common supply lines 36 and 43. The bridge circuit 38 is balanced, i.e., the set-point value and the actual value are equal to one another, when the same voltage lies across the collector emitter-paths of the transistors 35 and 39. This will be the case when the output signal of the first oxygen sensor 22 corresponds to the set-point value. When the desired set-point value is not equal to the actual value, a potential occurs across the diagonal of the bridge circuit 38. If the output voltage of the first oxygen sensor 22, i.e., the actual value, is greater than the desired or set-point value, then the voltage at the inverting input of the operational amplifier 48 is greater than the voltage present at the non-inverting input so that the operational amplifier 48, connected as a comparator, has an output potential approximately equal to that of the supply line 36. In the opposite case, i.e., when the actual value is smaller than the set-point value, the output potential of the operational amplifier 48 is approximately equal to that of the supply line 43. It is desirable to reduce the voltage range at the input of the integrator 26 so as to reduce the size of the integrating capacitor 64. For this purpose, the output signal from the operational amplifier 48 is used to alternately switch on one of the two transistors 56 and 57, while the other transistor remains blocked. Thus, the voltage fed through the conducting transistor to the input circuit of the integrator 63, 64 is lower than the output voltage of the operational amplifier 48. The output signal from the integrator 26 is fed to the transistorized control circuit 27 which changes the fuel-air mixture fed to the internal combustion engine until it has the desired nominal ratio, i.e., a mixture which is too lean is enriched and vice versa.

The second oxygen sensor 28 is connected to a second threshold switch 29 via an input network which is nearly identical to the input network of the control amplifier 24. This second threshold switch includes an operational amplifier 67. Since the construction and method of operation of the input network of this operational amplifier is substantially the same as that of the control amplifier 24, a description thereof is omitted to avoid repetition.

The outputs of the first threshold switch 25 and of the second threshold switch 29 are fed to the pulse comparator stage 30. This pulse comparator stage 30 includes a monostable multivibrator 68 whose trigger input is provided with the output signal from the first threshold switch 25. The output of the monostable multivibrator 68 is connected to the set input of a bistable multivibrator 69. The clock input of this bistable multivibrator 69 receives the output signal from the second threshold switch 29. The output of the bistable multivibrator 69, in turn, is connected to the warning lamp 31. Since it is desired that the pulse comparator stage 30 be operative only at certain constant operational conditions of the internal combustion engine, i.e., when the catalytic reactor 20 experiences the same gas throughput, the pulse comparator circuit 30 is controlled by a transducer 70 which senses that operational condition of the engine.

This transducer includes a third threshold switch 71 and a fourth threshold switch 72. The two signal inputs of the threshold switches 71 and 72 are joined and are both connected to the air flow rate meter 14. The outputs of the two threshold switches 71 and 72 are connected to a gating circuit 73. The third threshold switch 71 is connected to a non-inverting input of the gate circuit 73 and the threshold switch 72 is connected to an inverting input of the gate circuit 73. The output of the gate circuit 73 is connected to the control electrode of the switching transistor 52 and also to the reset input of the monostable multivibrator 68 as well as to a reset input of the bistable multivibrator 69.

The transducer 70 operates as follows: during a particular predetermined operational condition of the engine, for example when a particular air flow rate is exceeded, the third threshold switch 71 becomes conducting, but the somewhat higher threshold of the fourth threshold switch 72 has not yet been reached, so that the fourth threshold switch 72 is still blocked. In this case, the switching transistor 52 conducts and the set-point threshold of the first threshold switch 25 is abruptly changed, causing a modification of the composition of the fuel-air mixture fed to the engine and thus a change of the output voltages of the first and second oxygen sensors 22 and 28. When the first oxygen sensor 22 switches over, i.e., when a corresponding output signal is present at the output of the first threshold switch 25, the monostable multivibrator 68 switches over to its unstable state. The time during which it remains in this state is a limiting time which is characteristic of the time difference between the switching of the first oxygen sensor 22 and the switchover of the second oxygen sensor 28 which is still just acceptable. During the unstable switching state of the monostable multivibrator 68, the set input of the bistable multivibrator is provided with a signal. If an appropriate signal occurs at the output of the second threshold switch 29 while the monostable multivibrator 68 is in its unstable state, then the bistable multivibrator 69 is switched over and the lamp 31 lights up. This means that the phase shift between the switchover of the first oxygen sensor 22 and the second oxygen sensor 28 is too small and that the catalytic reactor 20 is defective. If the signal from the switch 29, due to the switchover of the second oxygen sensor 28 occurs only after the monostable multivibrator 68 has already switched back to its stable state, then the output state of the bistable multivibrator 69 remains unchanged and the warning lamp 31 is not energized. This means that the catalytic reactor 20 is still sufficiently active.

The transducer 70 which characterizes a particular, constant operational condition of the internal combustion engine could also be embodied, for example, by a mechanical switching contact provided on the air flow rate meter 14 or by any other suitable transducer for characterizing the appropriate operational condition of the engine 11. For example, this could be a throttle valve switch which would be actuated at some particular position of the throttle valve 15. Still another possibility to define a constant operational state for monitoring the activity of the catalytic reactor 20 is to use the state when the internal combustion engine is idling at constant rpm and at constant throttle position. In this quasi-stationary state, which has simplified operational conditions, the phase shift between the two output voltages from the first and second oxygen sensors 22 and 28 can be determined. This should be done immediately after the internal combustion engine has been decelerated, since the two oxygen sensors 22 and 28 cool off rapidly, resulting in a temperature-dependent change of their output potential.

What is claimed is:

1. A method for monitoring the activity of a catalytic reactor used in association with an internal combustion engine with fuel control, comprising the steps of:
   A. providing an exhaust gas composition sensor at the inlet and at the outlet of said catalytic reactor;
   B. finding a predetermined operational state of said internal combustion engine;
   C. initiating a change of the output signals of said exhaust composition sensors; and
   D. measuring the time delay between the occurrence of the change of output signals from said exhaust composition sensors;
      said time delay being an indicaton of the activity of said catalytic reactor.

2. A method according to claim 1, wherein said change of the output signal of said exhaust gas composition sensors is initiated by a change in the composition ratio of the fuel-air mixture admitted to the internal combustion engine.

3. A method according to claim 1, wherein said change of the output signal of said exhaust gas composition sensors is initiated by a change of the threshold voltage of a threshold switch connected to said fuel control which regulates the composition ratio of the fuel-air mixture admitted to the internal combustion engine.

4. An apparatus for monitoring the activity of a catalytic reactor, used in association with an internal combustion engine, said engine including a fuel control system, an exhaust system, and an air flow meter, said apparatus comprising:
   A. a first exhaust gas composition sensor, located in the exhaust system of the internal combustion engine, upstream of said catalytic reactor;
   B. a control amplifier, including a first threshold switch and an integrating circuit, whose input is connected to said first exhaust gas composition sensor; and whose output is connected to said fuel control system;
   C. a second exhaust gas composition sensor, located in the exhaust system of the internal combustion engine, downstream of said catalytic reactor;
   D. a second threshold switch, whose input is connected to said second exhaust gas composition sensor;
   E. a signal comparator and timing circuit whose inputs are connected to the outputs from said first and second threshold switches; and
   F. transducer means, located on said internal combustion engine for sensing and delivering an electrical output signal representative of an operational parameter of said engine, said electrical output signal being connected to said signal comparator and timing circuit.

5. An apparatus according to claim 4, wherein said signal comparator and timing circuit includes:
   i. a first monostable multivibrator whose input is connected to the output from said first threshold switch;
   ii. a bistable multivibrator, one of whose inputs is connected to the output of said first monostable multivibrator and another of whose inputs is connected to the output of said second threshold switch; and
   iii. a warning device, connected to the output of said bistable multivibrator and capable of being controlled thereby.

6. An apparatus according to claim 5, wherein the output of said transducer means is connected to the reset input of said bistable multivibrator.

7. An apparatus according to claim 5, wherein said bistable multivibrator is a D-type flip-flop circuit whose preset input is connected to the output of said monostable multivibrator and whose clock input is connected to the output of said second threshold switch.

8. An apparatus according to claim 4, wherein said control amplifier includes:
   i. a switch connected to said first threshold switch for changing the threshold voltage level thereof;
   whereby said electrical output signal from said transducer means is connected to said switch and triggers said switch when a pre-determined operational state of the engine is attained.

9. An apparatus according to claim 4, wherein said transducer means includes:
   i. a third threshold switch;
   ii. a fourth threshold switch; and
   iii. a logical gate circuit; the outputs from said third and fourth threshold switches being connected to the inputs of said logical gate circuit.

10. An apparatus according to claim 9, wherein the output from said air flow meter is connected to the inputs of said third and fourth threshold switches.

11. An apparatus according to claim 4, wherein said transducer means includes electrical contacts associated with said air flow meter of the internal combustion engine.

* * * * *